(12) United States Patent
Huang et al.

(10) Patent No.: US 12,602,803 B2
(45) Date of Patent: Apr. 14, 2026

(54) HEAD-MOUNTED DISPLAY AND METHOD FOR DEPTH PREDICTION

(71) Applicant: HTC Corporation, Taoyuan City (TW)

(72) Inventors: Kuan Yu Huang, Taoyuan City (TW); Chia Ying Lin, Taoyuan City (TW); Po Shian Liu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 279 days.

(21) Appl. No.: 18/621,081

(22) Filed: Mar. 28, 2024

(65) Prior Publication Data

US 2025/0308047 A1 Oct. 2, 2025

(51) Int. Cl.
*G06K 9/00* (2022.01)
*G06T 7/10* (2017.01)
*G06T 7/55* (2017.01)
*G06T 7/70* (2017.01)
*G06T 17/20* (2006.01)

(52) U.S. Cl.
CPC .................. *G06T 7/55* (2017.01); *G06T 7/10* (2017.01); *G06T 7/70* (2017.01); *G06T 17/205* (2013.01); *G06T 2207/10028* (2013.01); *G06T 2207/20081* (2013.01); *G06T 2207/20092* (2013.01); *G06T 2207/30184* (2013.01); *G06T 2207/30244* (2013.01)

(58) Field of Classification Search
CPC . G06T 2207/30244; G06T 2207/30184; G06T 2207/20092; G06T 2207/20081; G06T 2207/10028; G06T 17/205; G06T 7/70; G06T 7/10; G06T 7/55; G06F 3/0304;

G06F 3/017; G06F 3/012; G06F 3/011; H04N 13/363; H04N 13/332; H04N 13/106; H04N 13/122
See application file for complete search history.

(56) References Cited

U.S. PATENT DOCUMENTS

| | | | |
|---|---|---|---|
| 8,933,965 B2 * | 1/2015 | Tomite | G06T 19/006 |
| | | | 345/633 |
| 11,087,540 B2 * | 8/2021 | Ernst | G02B 27/0172 |
| 11,756,229 B2 * | 9/2023 | Sommer | G06T 7/73 |
| | | | 382/103 |

(Continued)

FOREIGN PATENT DOCUMENTS

| | | |
|---|---|---|
| CN | 104106262 | 10/2014 |
| CN | 110892408 | 3/2020 |

(Continued)

OTHER PUBLICATIONS

"Office Action of Taiwan Counterpart Application", issued on Mar. 7, 2025, p. 1-p. 6.

*Primary Examiner* — Avinash Yentrapati
(74) *Attorney, Agent, or Firm* — JCIPRNET

(57) ABSTRACT

A head-mounted display and a method for depth prediction are provided. The method includes: obtaining location information and a pose of the head-mounted display; obtaining a first street view from a database according to the location information and the pose; performing image processing on a first image captured by the head-mounted display; determining whether the processed first image matches the first street view; generating depth information for an image segment according to the first street view in response to the processed first image matching the first street view; and outputting the depth information.

17 Claims, 4 Drawing Sheets

(56)  References Cited

U.S. PATENT DOCUMENTS

| | | | | |
|---|---|---|---|---|
| 11,790,490 B2 * | 10/2023 | Li | .......................... | G06N 3/0475 |
| | | | | 382/155 |
| 12,236,527 B2 * | 2/2025 | Huang | ..................... | G06F 3/011 |
| 2015/0302250 A1 * | 10/2015 | Miller | .................. | G06V 20/653 |
| | | | | 382/203 |
| 2017/0053450 A1 * | 2/2017 | Rodriguez | ........... | G02B 27/017 |
| 2019/0147663 A1 * | 5/2019 | Mullins | .................. | G06V 20/20 |
| | | | | 382/218 |
| 2019/0285896 A1 * | 9/2019 | Kobayashi | ............ | G06F 3/0304 |
| 2020/0342673 A1 * | 10/2020 | Lohr | ........................ | G06F 3/011 |
| 2021/0223858 A1 * | 7/2021 | Barak | ..................... | G06F 1/163 |
| 2022/0292699 A1 * | 9/2022 | Zhu | ....................... | G05D 1/0214 |
| 2023/0298130 A1 * | 9/2023 | Tamaki | ................... | H04L 67/12 |
| | | | | 382/305 |
| 2024/0087252 A1 * | 3/2024 | Saha | ........................ | G06F 21/31 |
| 2025/0157108 A1 * | 5/2025 | Harrises | ............... | G06T 19/006 |

FOREIGN PATENT DOCUMENTS

| | | |
|---|---|---|
| CN | 111275824 | 6/2020 |
| CN | 112513944 | 3/2021 |
| CN | 114998557 | 9/2022 |
| CN | 115032795 | 9/2022 |
| JP | 2018041009 | 3/2018 |
| TW | 202328914 | 7/2023 |

* cited by examiner

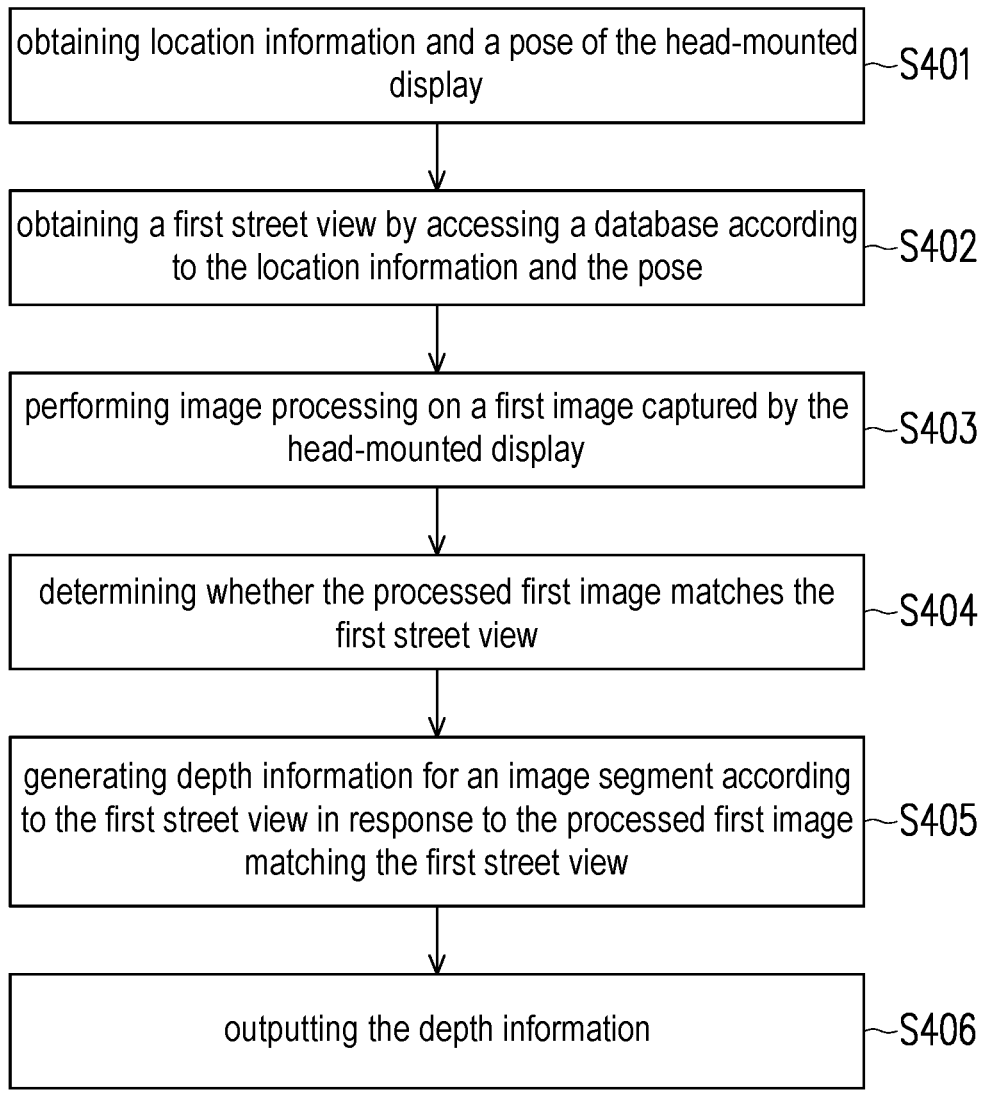

| obtaining location information and a pose of the head-mounted display | ~S401 |
| obtaining a first street view by accessing a database according to the location information and the pose | ~S402 |
| performing image processing on a first image captured by the head-mounted display | ~S403 |
| determining whether the processed first image matches the first street view | ~S404 |
| generating depth information for an image segment according to the first street view in response to the processed first image matching the first street view | ~S405 |
| outputting the depth information | ~S406 |

FIG. 4

HEAD-MOUNTED DISPLAY AND METHOD FOR DEPTH PREDICTION

BACKGROUND

Technical Field

The disclosure relates to extended reality (XR) technology, and particularly relates to a head-mounted display (HMD) and a method for depth information.

Description of Related Art

Existing depth-based XR (e.g., augmented reality (AR) or mixed reality (MR)) applications are constrained by the maximum measurable depth range of their depth sensors, resulting in a significant decrease in user interaction with distant objects and a consequent loss of immersive experience. The limitation hinders the realization of fully immersive outdoor experiences with virtual objects, constraining the overall potential of the XR applications.

SUMMARY

The present invention is directed to an HMD and a method for depth information.

The present invention is directed to a head-mounted display for depth prediction, including a storage medium and a processor. The storage medium includes a plurality of modules. The processor is coupled to the storage medium, wherein the processor accesses and executes the plurality of modules, wherein the plurality of modules include a geospatial information module, an image projector, a domain transfer module, a ranking module, and a depth optimizer. The geospatial information module obtains location information and a pose of the head-mounted display. The image projector obtains a first street view from a database according to the location information and the pose. The domain transfer module performs image processing on a first image captured by the head-mounted display. The ranking module determines whether the processed first image matches the first street view. The depth optimizer generates depth information for an image segment according to the first street view in response to the processed first image matching the first street view, and outputs the depth information.

In one embodiment of the present invention, the domain transfer module performs the image processing by inputting the first image into a machine learning model.

In one embodiment of the present invention, the domain transfer module trains the machine learning model by a training data set, wherein the training data set includes a plurality of historical images corresponding to the same viewpoint and a plurality of timestamps respectively corresponding to the plurality of historical images.

In one embodiment of the present invention, the plurality of modules further include a mesh retrieve module. The mesh retrieve module obtains a three-dimensional mesh of an area from the database, and down-samples a part of the three-dimensional mesh to obtain a simplified three-dimensional mesh, wherein the image projector projects the simplified three-dimensional mesh to a virtual plane to obtain the first street view.

In one embodiment of the present invention, a distance between the part of the three-dimensional mesh and the head-mounted display is greater than a threshold.

In one embodiment of the present invention, the depth optimizer performs instance-level semantic segmentation on a second image captured by the head-mounted display to obtain the image segment.

In one embodiment of the present invention, the depth optimizer obtains, from the database, a plurality of depth values respectively corresponding to a plurality of pixels in the image segment, wherein the depth optimizer performs quantization on the plurality of depth values to generate the depth information.

In one embodiment of the present invention, the depth optimizer performs the quantization according to a distance between the head-mounted display and an object corresponding to the image segment.

In one embodiment of the present invention, the image projector obtains a plurality of street views from the database according to the location information and the pose, wherein the ranking module determines the processed first image matches the first street view by performing simultaneous localization and mapping algorithm on the plurality street views.

In one embodiment of the present invention, the head-mounted display further includes a human-machine interface. The human-machine interface is coupled to the processor, wherein the ranking module receives a user command through the human-machine interface and determines the processed first image matches the first street view according to the user command.

In one embodiment of the present invention, the head-mounted display further includes a camera. The camera is coupled to the processor, wherein the camera captures a plurality of images, wherein the ranking module determines the processed first image, selected from the plurality of images, matches the first street view based on the user command.

In one embodiment of the present invention, the ranking module displays a plurality of street views through the human-machine interface, wherein the first street view is selected from the plurality of street views according to the user command.

In one embodiment of the present invention, the head-mounted display further includes a human-machine interface. The human-machine interface is coupled to the processor, wherein the geospatial information module receives a user command through the human-machine interface and calibrates the location information or the pose according to the user command.

In one embodiment of the present invention, the head-mounted display further includes a transceiver. The transceiver is coupled to the processor, wherein the geospatial information module receives a positioning signal through the transceiver to obtain the location information.

In one embodiment of the present invention, the head-mounted display further includes an inertial measurement unit. The inertial measurement unit is coupled to the processor, wherein the geospatial information module obtains the pose by the inertial measurement unit.

In one embodiment of the present invention, the head-mounted display further includes a human-machine interface. The human-machine interface is coupled to the processor, wherein the processor outputs, through the human-machine interface, a virtual scene including the image segment according to the depth information.

The present invention is directed to a method for depth prediction, adapted to a head-mounted display, wherein the method includes: obtaining location information and a pose of the head-mounted display; obtaining a first street view from a database according to the location information and the pose; performing image processing on a first image captured by the head-mounted display; determining whether the processed first image matches the first street view; generating depth information for an image segment according to the first street view in response to the processed first image matching the first street view; and outputting the depth information.

Based on above description, the HMD may render an image segment corresponding to an object located far from the HMD with precise depth information.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 illustrates a flowchart of a method for depth prediction according to an embodiment of the present invention.

DESCRIPTION OF THE EMBODIMENTS

Figure 1:
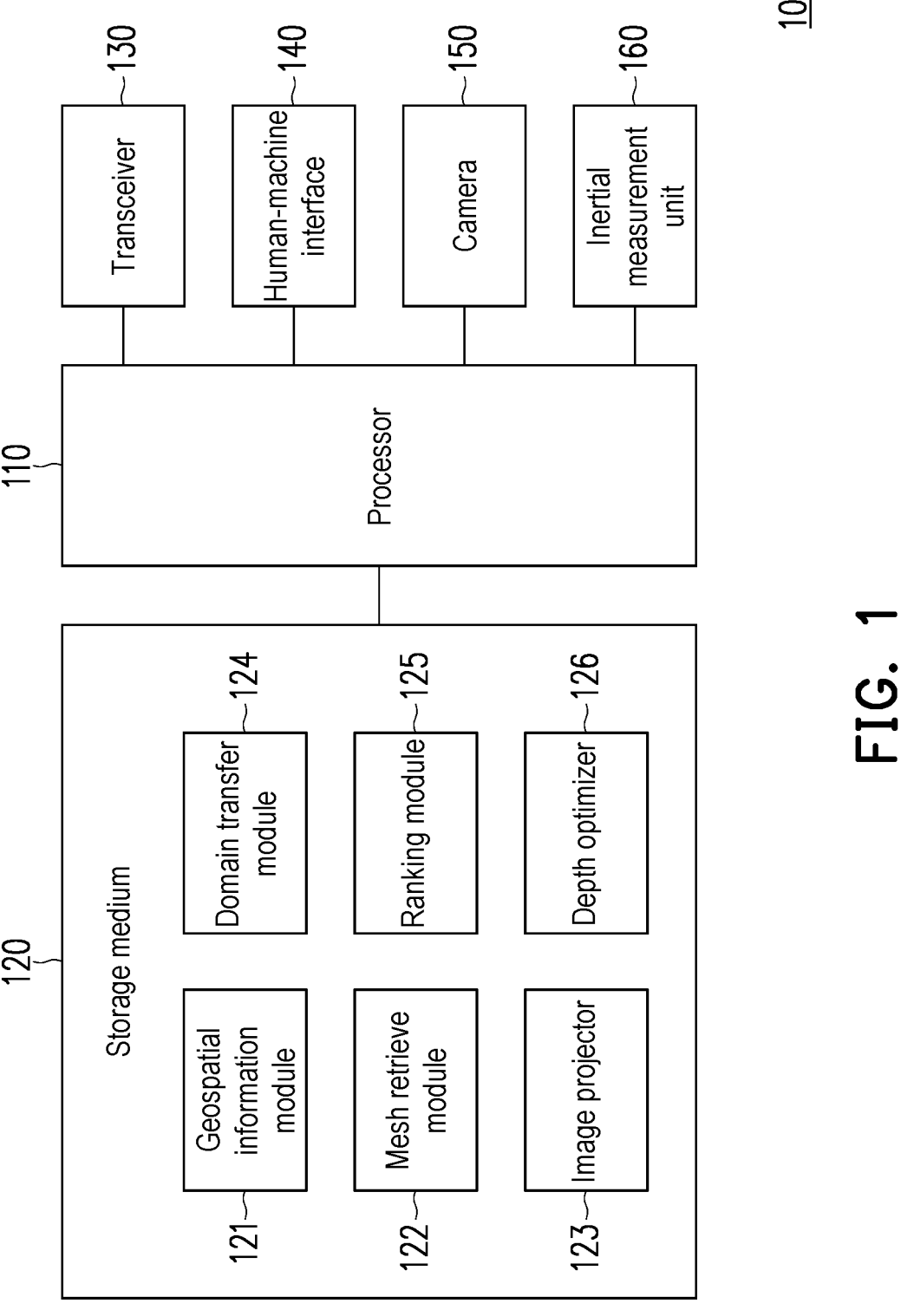
FIG. 1 illustrates a schematic diagram of an HMD according to an embodiment of the present invention.

FIG. 1 illustrates a schematic diagram of an HMD 100 according to an embodiment of the present invention, wherein the HMD 100 may be used for implementation of XR applications. The HMD 100 may include a processor 110, a storage medium 120, a transceiver 130, a human-machine interface (HMI) 140, a camera 150, and an inertial measurement unit (IMU) 160.

The processor 110 may be, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar device or a combination of the above devices. The processor 110 may be coupled to the storage medium 120, the transceiver 130, the HMI 140, the camera 150, and the IMU 160.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110, wherein the plurality of modules may include a geospatial information module 121, a mesh retrieve module 122, an image projector 123, a domain transfer module 124, a ranking module 125, and a depth optimizer 126.

The transceiver 130 may be configured to transmit or receive wireless signals. The transceiver 130 may also perform operations such as low noise amplifying, impedance matching, frequency mixing, up or down frequency conversion, filtering, amplifying, and so forth. The processor 110 may communicate with an external electronic device (e.g., a database) via the transceiver 130. In one embodiment, the geospatial information module 111 may receive a positioning signal through the transceiver 130, wherein the positioning signal may include a global positioning system (GPS) signal. The geospatial information module 121 may obtain the location information of the HMD 100 from the positioning signal.

The HMI 140 may include one or more input/output devices. The user wearing the HMD 100 may interact (e.g., input a user command to the HMD 100 or watch an image displayed by the HMD 100) with the virtual scene created by the HMD 100 through the HMD 140. For example, the HMI 140 may include a camera for capturing the gesture of the user, wherein the user may interact with the virtual scene through the gesture. The HMI 140 may include a display or a light source for providing a virtual scene to the user wearing the HMD 100. The HMI 140 may include a portable device (e.g., a handheld controller), wherein the user may interact with the virtual scene by manipulating the portable device.

The camera 150 may be a photographic device for capturing images such as a street view. The camera 150 may include an image sensor such as a complementary metal oxide semiconductor (CMOS) sensor or a charge coupled device (CCD) sensor.

The IMU 160 may include an accelerometer or a gyroscope. The IMU 160 may detect linear acceleration or angular acceleration of the HMD 100. The geospatial information module 121 may obtain a pose of a movement of the HMD 100 by using the IMU 160.

The geospatial information module 121 may obtain location information of the HMD 100 and the pose of the HMD 100. The geospatial information module 121 may receive a positioning signal (e.g., a GPS signal) through the transceiver 130 to obtain the location information of the HMD 100. The geospatial information module 121 may obtain or detect the pose of the HMD 100 through the IMU 160.

In one embodiment, the position information or the pose of the HMD 100 obtained by the geospatial information module 121 may be manually calibrated. Specifically, the geospatial information module 121 may receive a user command through the HMI 140 and may calibrate the location information or the pose of the HMD 100 according to the user command. For example, the user may input longitude and latitude to the HMD 100 through the HMI 140. The geospatial information module 121 may calibrate the location information of the HMD 100 according to the longitude and the latitude inputted by the user.

Figure 2:
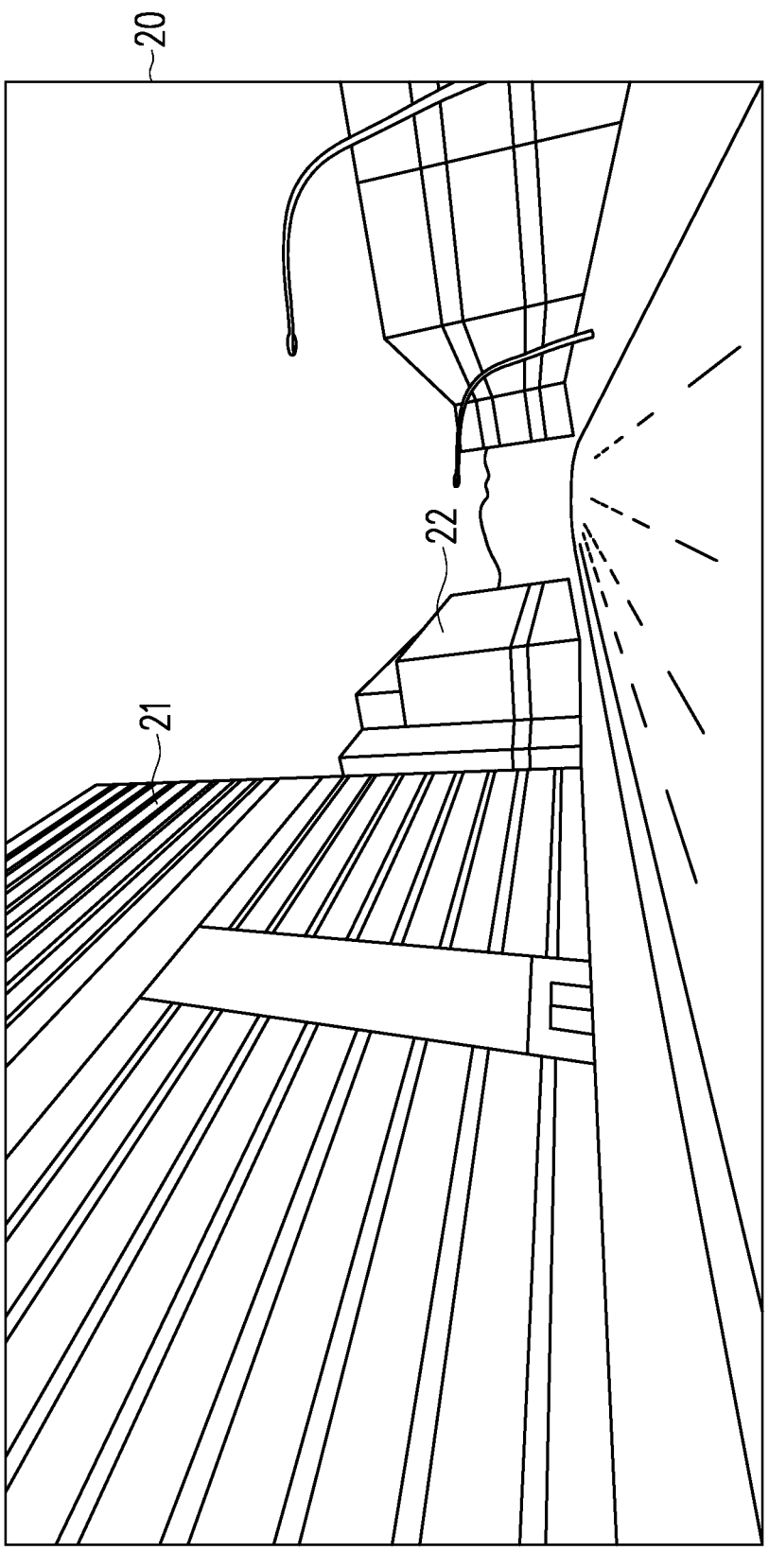
FIG. 2 illustrates a schematic diagram of a street view according to an embodiment of the present invention.

FIG. 2 illustrates a schematic diagram of a street view 20 according to an embodiment of the present invention, wherein the street view may include a building 21 and a building 22. The image projector 130 may obtain one or more street views (e.g., street view 20) from a database according to the location information and the pose of the HMD 100. Specifically, the database may record one or more three-dimensional (3D) meshes of one or more areas, wherein each 3D mesh is corresponded to specific location information and a specific pose of the HMD 100. The database may further record distance information (or depth value) of each sampled point (or pixel) of a 3D mesh, wherein the distance information may include a distance between a sampled point of the 3D mesh and a sensor (e.g., camera, radar, or lidar) capturing the 3D mesh. The mesh retrieve module 122 may access the database through the transceiver 130 and may obtain, from the database, a 3D mesh of an area corresponding to the location and the pose of the HMD 100. After that, the image projector 123 may project the 3D mesh to a virtual plan to obtain the street view 20.

In one embodiment, after the 3D mesh is obtained by the mesh retrieve module 122, the mesh retrieve module 122 may determine whether a distance between a specific part of the 3D mesh and the HMD 100 is greater than a threshold. If the distance between the specific part of the 3D mesh and the HMD 100 is greater than the threshold, the mesh retrieve module 122 may determine that the specific part of the 3D mesh is far from the user wearing the HMD 100, and the details of the specific part of the 3D mesh may be less important than the details of a part of the 3D mesh which is nearer to the HMD 100. Accordingly, the mesh retrieve module 122 may down-sample the specific part of the 3D mesh to obtain a simplified 3D mesh. The image projector 123 may project the simplified 3D mesh to a virtual plane to obtain the street view 20, thereby saving the computation resources of the HMD 100.

The processor 110 may capture one or more images through the camera 150. In order to guarantee the image captured by the camera 150 and the street view 20 recorded in the database are in the similar environment, the domain transfer module 124 may perform image processing on an image captured by the camera 150 to obtain a processed image. For example, the domain transfer module 124 may perform the image processing on the image by inputting the image into a machine learning (ML) model. The ML model may output the processed image. After the image processing for the image, the appearance of an object in the image may be changed. For example, a building under construction in the image may be converted to a completed building in the processed image, the image of a raining day may be converted to the processed image of a sunny day, or the image of nighttime may be converted to the processed image of morning.

In one embodiment, the ML model may be trained by the domain transfer module 124 according to a training data set, wherein the training data set may include a plurality of historical images corresponding to the same view point and a plurality of timestamps respectively corresponding to the plurality of historical images. Each training data in the training data set may be labeled with a corresponding view point.

After the processed image is generated by the domain transfer module 124, the ranking module 125 may determine whether the processed image matches the street view 20 obtained by the image projector 123. In one embodiment, the image projector 123 may obtain, from the database, a plurality of street views (including street view 20) according to the location information and the pose of the HMD 100. The ranking module 125 may determine the processed image matches the street view 20 by performing simultaneous localization and mapping (SLAM) algorithm on the plurality of street views. That is, the ranking module 125 may select, from the plurality of street views, the street view 20 matching the processed image by performing the SLAM algorithm.

In one embodiment, the camera 150 may capture a plurality of images. If the ranking module 125 determines that the street view 20 obtained by the image projector 123 matches the plurality of images, the ranking module 125 may display the plurality of images through the HMI 140 for the user to select an image (or processed image) most similar to the street view 20 from the plurality of images. The HMI 140 may receive a user command for image selection through the HMI 140. The ranking module 125 may determine that the image (or processed image), selected from the plurality of images, matches the street view 20 based on the user command.

Figure 3:
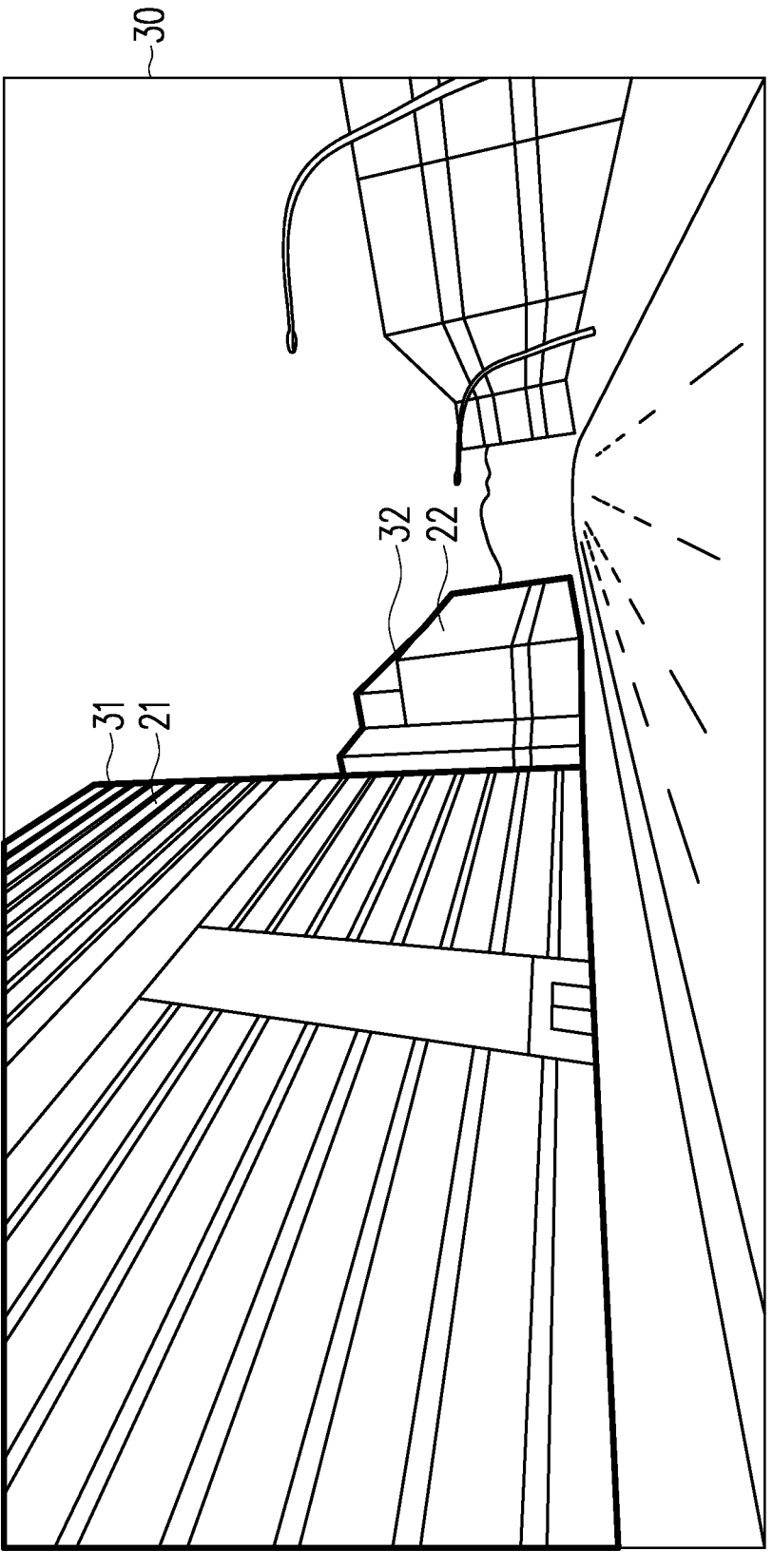
FIG. 3 illustrates a schematic diagram of an image captured by the camera according to an embodiment of the present invention.

After the street view (e.g., street view 20) matching the processed image is determined, the processor 110 may capture an image through the camera 150. FIG. 3 illustrates a schematic diagram of an image 30 captured by the camera according to an embodiment of the present invention. The depth optimizer 126 may perform instance-level semantic segmentation on the image 30 to obtain one or more image segments such as image segment 31 corresponding to the building 21 or image segment 32 corresponding to the building 22. The depth optimizer 126 may generate depth information for the image segment according to the street view 20, and may output the depth information. The processor 110 may output a virtual scene through the HMI 140, wherein the virtual scene may include the image segment rendered by the depth information. For example, the processor 110 may render the image 30 to generate a virtual scene and may provide the virtual scene to the user through the HMI 140. Specifically, the depth optimizer 126 may generate the depth information of the image segment 31 according to the street view 20. The processor 110 may render the image segment 31 according to the depth information of the image segment 31 to generate the virtual scene. On the other hand, the depth optimizer 126 may generate the depth information of the image segment 32 according to the street view 20. The processor 110 may render the image segment 32 according to the depth information of the image segment 32 to generate the virtual scene. Since the distance between the building 22 and the HMD 100 is greater than the distance between the building 21 and the HMD 100, the depth value in the depth information of the image segment 32 may be greater than the depth value in the depth information of the image segment 31.

In one embodiment, the depth optimizer 126 may obtain, from the database, a plurality of depth values respectively corresponding to the plurality of pixels in an image segment. The depth optimizer 126 may perform quantization on the plurality of depth values to generate the depth information of the image segment. Specifically, the depth optimizer 126 may perform the quantization according to a distance between the HMD 100 and an object corresponding to the image segment. The resolution of the depth information of the image segment may be inversely proportional to the distance between the HMD 100 and the object corresponding to the image segment. In one embodiment, the depth information of an image segment may be quantized such that all pixels in the same image segment may have the same depth value.

For example, the depth optimizer 126 may obtain, from the database, a plurality of depth values respectively corresponding to a plurality of pixels in the image segment 31 and a plurality of depth values respectively corresponding to a plurality of pixels in the image segment 32. Since the distance between the HMD 100 and the building 22 corresponding to the image segment 32 is greater than the distance between the HMD 100 and the building 21 corresponding to the image segment 31, the resolution of the depth information of the image segment 32 may be less than the resolution of the depth information of the image segment 31. That is, the quantization level (e.g., 10 bits) of the image segment 31 may be greater than the quantization level (e.g., 8 bits) of the image segment 32.

FIG. 4 illustrates a flowchart of a method for depth prediction according to an embodiment of the present invention, wherein the method may be implemented by the HMD 100 as shown in FIG. 1. In step S401, obtaining location information and a pose of the head-mounted display. In step S402, obtaining a first street view from a database according to the location information and the pose. In step S403, performing image processing on a first image captured by the head-mounted display. In step S404, determining whether the processed first image matches the first street view. In step S405, generating depth information for an image segment according to the first street view in response to the processed first image matching the first street view. In step S406, outputting the depth information.

In summary, the HMD of the present invention may obtain the location information and the pose of the HMD, so as to position the user wearing the HMD. After the location of the user being determined, the HMD may obtain depth information for an image segment and may render the image segment according to the depth information. Thus, even if the distance between the object corresponding to the image segment and the HMD is beyond the maximum measurable depth range of a depth sensor, the HMD may still render the image segment with the depth information precisely. Accordingly, the user may interact with the object located far from the HMD. The HMD of the present invention may overcome the measured distance limitation of built-in depth sensor, may operate seamlessly across various whether and solar conditions, and may main low memory usage (even for extensive scenes).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display for depth prediction, comprising:
a storage medium, comprising a plurality of modules; and
a processor, coupled to the storage medium, wherein the processor accesses and executes the plurality of modules, wherein the plurality of modules comprise:
a geospatial information module, obtaining location information and a pose of the head-mounted display;
an image projector, obtaining a first street view from a database according to the location information and the pose;
a domain transfer module, performing image processing on a first image captured by the head-mounted display;
a ranking module, determining whether the processed first image matches the first street view; and
a depth optimizer, generating depth information for an image segment according to the first street view in response to the processed first image matching the first street view, and outputting the depth information.

2. The head-mounted display according to claim 1, wherein the domain transfer module performs the image processing by inputting the first image into a machine learning model.

3. The head-mounted display according to claim 2, wherein the domain transfer module trains the machine learning model by a training data set, wherein the training data set comprises a plurality of historical images corresponding to the same viewpoint and a plurality of timestamps respectively corresponding to the plurality of historical images.

4. The head-mounted display according to claim 1, wherein the plurality of modules further comprise:
a mesh retrieve module, obtaining a three-dimensional mesh of an area from the database, and down-sampling a part of the three-dimensional mesh to obtain a simplified three-dimensional mesh, wherein
the image projector projects the simplified three-dimensional mesh to a virtual plane to obtain the first street view.

5. The head-mounted display according to claim 4, wherein a distance between the part of the three-dimensional mesh and the head-mounted display is greater than a threshold.

6. The head-mounted display according to claim 1, wherein the depth optimizer performs instance-level semantic segmentation on a second image captured by the head-mounted display to obtain the image segment.

7. The head-mounted display according to claim 1, wherein the depth optimizer obtains, from the database, a plurality of depth values respectively corresponding to a plurality of pixels in the image segment, wherein the depth optimizer performs quantization on the plurality of depth values to generate the depth information.

8. The head-mounted display according to claim 7, wherein the depth optimizer performs the quantization according to a distance between the head-mounted display and an object corresponding to the image segment.

9. The head-mounted display according to claim 1, wherein the image projector obtains a plurality of street views from the database according to the location information and the pose, wherein the ranking module determines the processed first image matches the first street view by performing simultaneous localization and mapping algorithm on the plurality street views.

10. The head-mounted display according to claim 1, further comprising:
a human-machine interface, coupled to the processor, wherein the ranking module receives a user command through the human-machine interface and determines the processed first image matches the first street view according to the user command.

11. The head-mounted display according to claim 10, further comprising:
a camera, coupled to the processor, wherein the camera captures a plurality of images, wherein the ranking module determines the processed first image, selected from the plurality of images, matches the first street view based on the user command.

12. The head-mounted display according to claim 10, wherein the ranking module displays a plurality of street views through the human-machine interface, wherein the first street view is selected from the plurality of street views according to the user command.

13. The head-mounted display according to claim 1, further comprising:
a human-machine interface, coupled to the processor, wherein the geospatial information module receives a user command through the human-machine interface and calibrates the location information or the pose according to the user command.

14. The head-mounted display according to claim 1, further comprising:

a transceiver, coupled to the processor, wherein the geospatial information module receives a positioning signal through the transceiver to obtain the location information.

15. The head-mounted display according to claim 1, further comprising:

an inertial measurement unit, coupled to the processor, wherein the geospatial information module obtains the pose by the inertial measurement unit.

16. The head-mounted display according to claim 1, further comprising:

a human-machine interface, coupled to the processor, wherein the processor outputs, through the human-machine interface, a virtual scene comprising the image segment according to the depth information.

17. A method for depth prediction, adapted to a head-mounted display, wherein the method comprises:

obtaining location information and a pose of the head-mounted display;

obtaining a first street view from a database according to the location information and the pose;

performing image processing on a first image captured by the head-mounted display;

determining whether the processed first image matches the first street view;

generating depth information for an image segment according to the first street view in response to the processed first image matching the first street view; and outputting the depth information.

\*  \*  \*  \*  \*